July 29, 1941.  W. L. GROENE  2,250,634
HYDRAULIC CENTER DRIVE CHUCK
Filed April 16, 1940  3 Sheets-Sheet 2
FIG. II
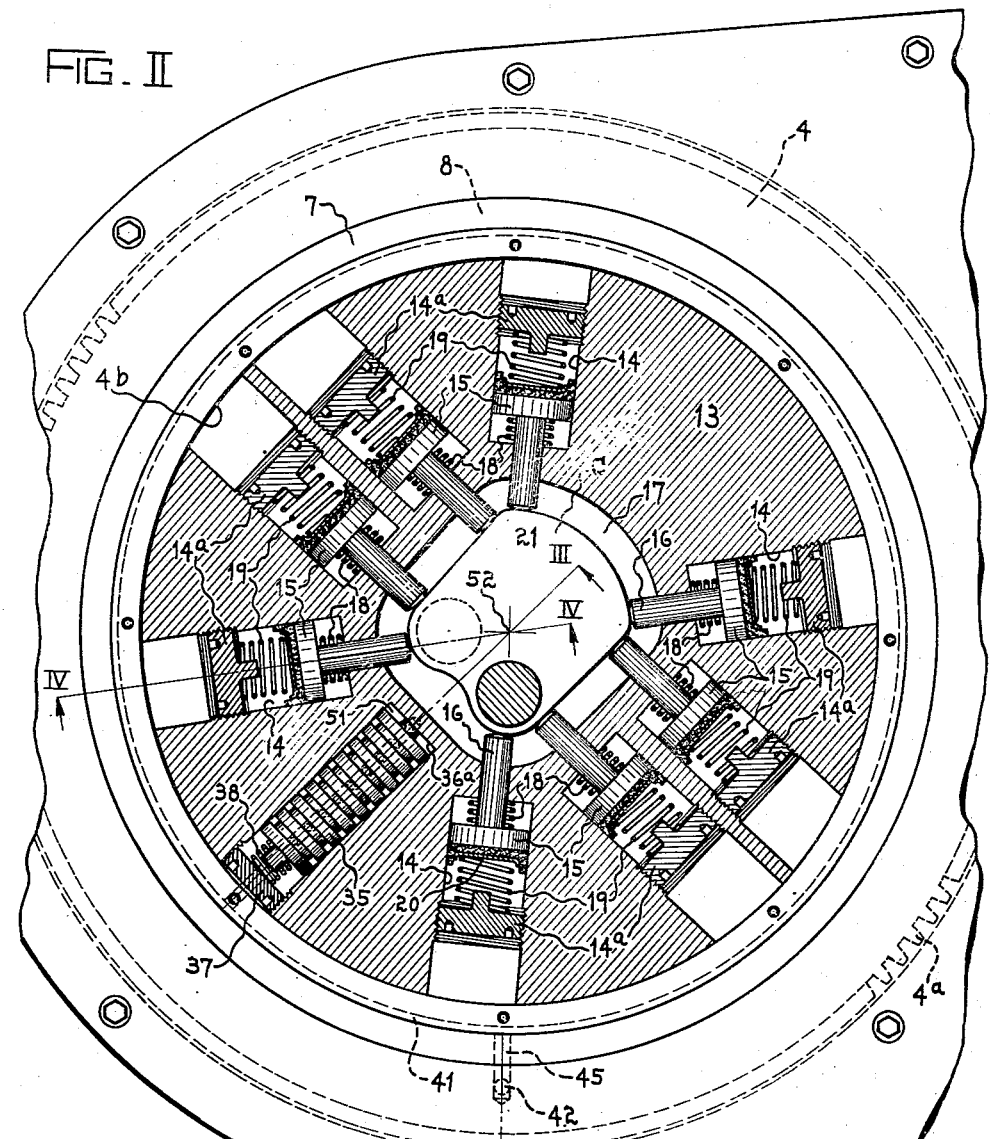
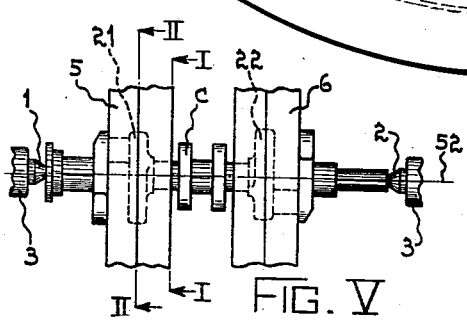
FIG. V
INVENTOR.
Willard L. Groene

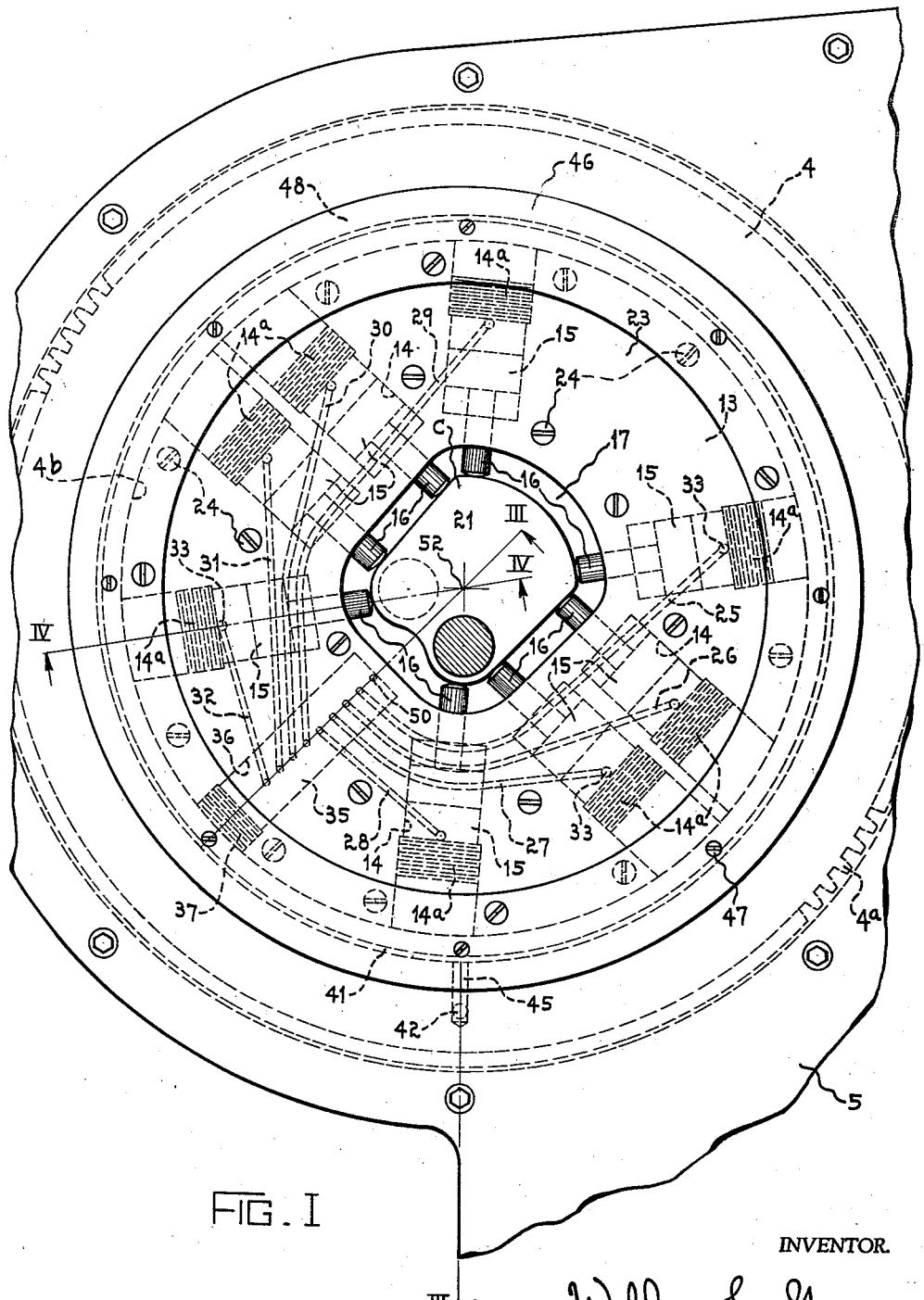
FIG. I

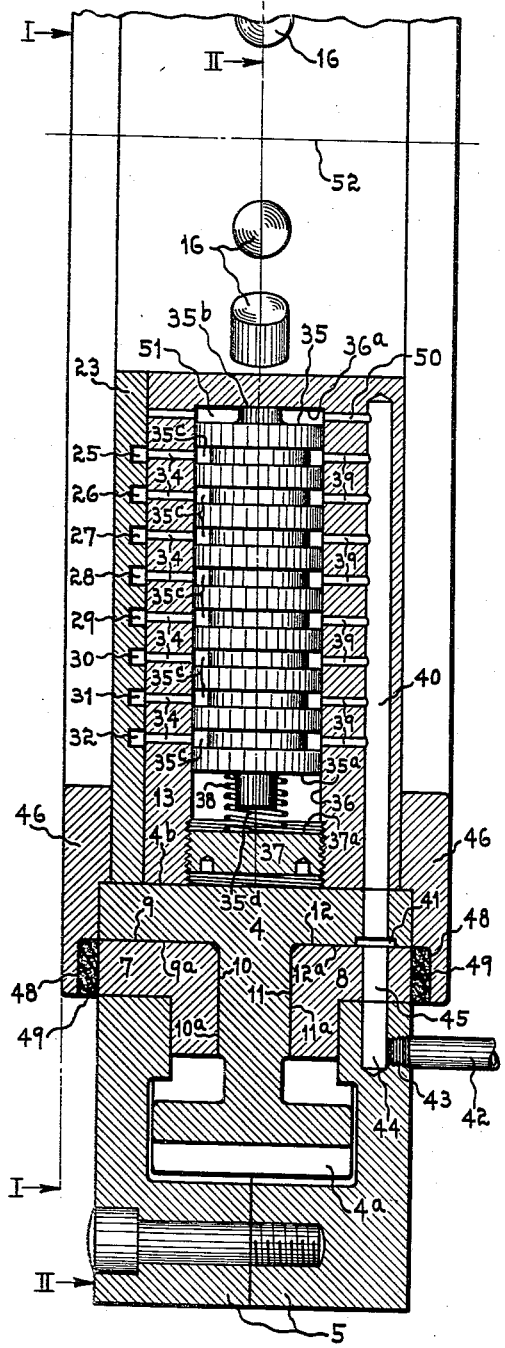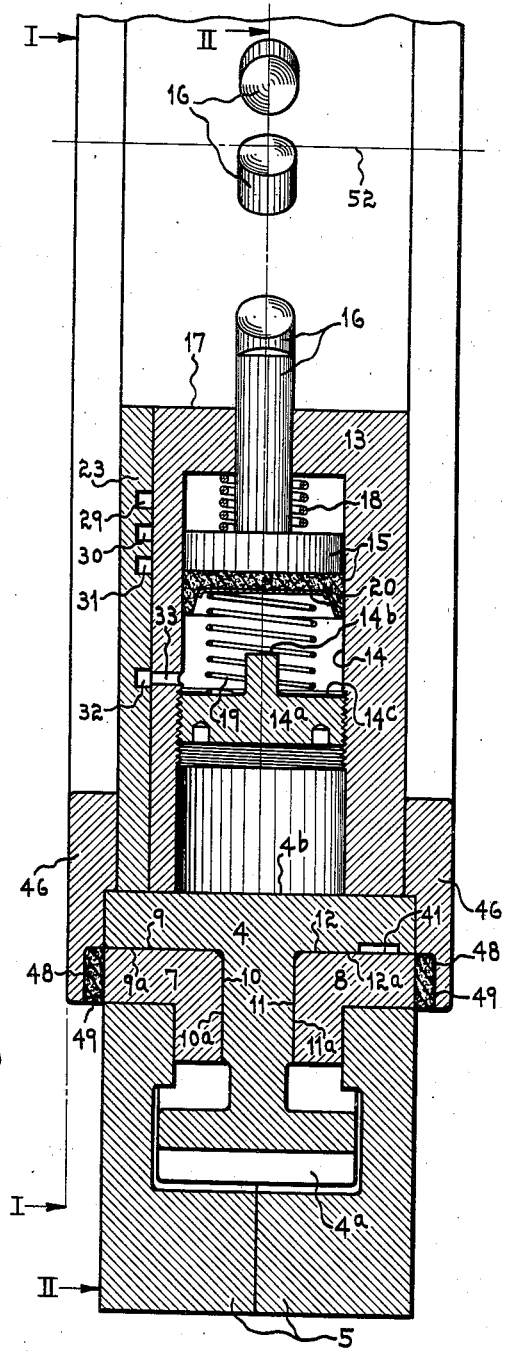

Patented July 29, 1941

2,250,634

UNITED STATES PATENT OFFICE 2,250,634

HYDRAULIC CENTER DRIVE CHUCK

Willard L. Groene, Cincinnati, Ohio, assignor to The R. K. Le Blond Machine Tool Company, Cincinnati, Ohio, a corporation of Delaware Application April 16, 1940, Serial No. 329,929

10 Claims. (Cl. 82—40)

This invention pertains to the gripping of rough irregular prelocated work pieces in a lathe for rigidly supporting and rotating said work while machining operations are being performed thereon. More specifically this invention pertains to hydraulically operated chucking mechanism for use in connection with center drive lathes for gripping and supporting a work piece intermediate its ends in its correct prelocated position in the lathe.

This invention is especially adapted to the chucking of crankshafts in center drive lathes by means of their rough irregular webs so that the various bearing portions may be machined by means of cutting tools in the lathe.

The object of this invention is to provide in a lathe, particularly of the center drive type, means for prelocating or centering a work piece on the axis of rotation of the lathe, and then to provide center drive chucking mechanism which is hydraulically operated to engage the work piece by means of rough irregular surfaces thereof intermediate the means for centering and supporting the ends of the work piece in such a way as not to distort or bend the work piece from its true axis of rotation in the lathe.

Another object of this invention is to provide in a center drive crankshaft lathe one or more center drive chucks adapted to engage the rough irregular webs of a crank shaft prelocated on centers at each end on the axis of rotation in the lathe and to apply these work engaging members by fluid pressure with equal force against the work piece or rough crankshaft web, so as to in no way distort the shaft from its true position on the axis of the lathe. It is then the object to provide hydraulically operated means for locking the work engaging members to the chuck body against further movement so that the crankshaft will be rigidly and positively held in accurately chucked position on the axis of rotation of the lathe and in such a rigid manner that the cutting action of the cutting tools of the lathe on the work piece will not distort it from its true position.

Another object of this invention is to provide in a center drive lathe, means for supporting the ends of a work piece for centering it on the proper axis of rotation of the lathe, then to provide center drive chucking mechanism for engaging the work piece intermediate the centers comprising a series of hydraulically actuated plungers adapted to move radially of the axis of rotation of the lathe to engage said work piece from a plurality of different directions with equal force and in such a manner as to maintain the work piece on the axis of rotation when fully engaged firmly on the rough irregular work surfaces of the work piece. It is then the object to provide hydraulic locking means whereby the plungers can not move back away from the work and may be rigidly held thereon by hydraulic pressure during the cutting operation of the cutting tools of the lathe on the work piece.

Another object of this invention is to provide a hydraulically operated chuck having a series of work engaging members movable to engage the work in equalizing action and after said work engaging members have fully and positively engaged the work piece it is then the object to provide hydraulic means for automatically locking these work engaging members in firm engagement with the work while at the same time locking out any equalizing action these work engaging members previously had.

Further features and advantages of this invention will be set forth in the detailed description of the drawings in which—

Figure I is a right hand end elevation of one of the center drive ring gear assemblies of a double center drive lathe as shown on the line I—I of Figure V.

Figure II is a transverse section through the center drive chucking mechanism shown in Figure I on the line II—II of Figures III, IV, and V, showing the hydraulically operated work engaging plungers and the automatic shuttle control valve for effecting automatic hydraulic locking of these plungers when engaged on the work.

Figure III is a cross section of a portion of the center drive chuck mechanism shown on the line III—III of Figures I and II, particularly showing the shuttle control valve for effecting the automatic hydraulic locking of the working engaging members against movement on the chuck body when engaged with the work piece.

Figure IV is a cross section through a portion of the chucking mechanism on the line IV—IV of Figures I and II, particularly showing the detailed assembly of a work engaging plunger.

Figure V is a diagrammatic view showing the typical arrangement of a double center drive lathe to which this mechanism may be applied.

For illustrative purposes this invention is shown applied to the gripping of a crankshaft by means of its rough webs in a typical center drive crankshaft lathe as shown diagrammatically in Figure V. The crankshaft C is prelocated or centered on the axis of rotation 52 in the lathe by the usual lathe centers 1 and 2 carried in appropriate tailstocks 3 mounted on the frame of such a lathe, as is customary. The crankshaft is supported and rotated by this chucking mechanism comprising center drive ring gear 4 carried in appropriate center drive housings 5 and 6 mounted in the frame of a double center drive crankshaft lathe. Since in this instance the center drive ring gear chucking mechanism in each of the housings 5 and 6 is substantially identical, it will suffice to describe the mechanism in one of these housings, namely the mechanism in housing 5. Noting particularly Figures III and IV, the center drive ring gear 4 is journaled on suitable bearings 7 and 8 having bearing surfaces 9, 10, 11 and 12 respectively, upon which the surfaces 9a, 10a, 11a and 12a of the center drive ring gear 4 operate, these bearings 7 and 8 being appropriately fixed in the housing 5. On the outer end of the ring gear 4, are provided the usual gear teeth 4a which are driven by suitable power transmission mechanism as is common practice in center drive lathes of this type.

In the bore 4b of this center drive ring gear 4 is fixed the cartridge 13 in which is formed a series of radially extending bores 14 and in which operate a series of hydraulically actuated pistons 15 having work engaging plungers 16 projecting into the central bore 17 of the cartridge 13 through which the work piece C is inserted. The outer ends of these cylinder bores 14 are appropriately closed off by threaded plugs 14a, which have a projection 14b to limit the outward movement of the piston 15 and the plunger 16 under the influence of the return spring 18. A relatively lighter spring 19 bears against the surface 14c of the plug 14a and also against a washer 20 resting against the composition portion of the pistons 15, so as to maintain proper fluid tight engagements of this composition portion of the pistons 15 with the bore 14 in the cartridge 13, thus making a leak proof piston and cylinder arrangement. Each of the work engaging plungers 16 are adapted to engage, in this particular illustrative case, the rough irregular webs 21 and 22 of the crankshaft C.

On one side of the cartridge 13 is fastened a plate 23 by suitable screws 24 in which are formed a series of slotted passageways 25 to 32, inclusive, each connected through a passageway 33 to the bore 14 of the hydraulic operated work engaging cylinder. Each of these passageways, as best shown in Figure III, is connected through suitable ports 34, associated with the shuttle control valve 35, slidably mounted in a bore 36 in the cartridge 13. In the bore 36 is appropriately threaded a plug 37 which confines a return spring 38 engaging the surface 37a of this plug and also the surface 35a of the shuttle valve 35 so as to normally urge this shuttle valve 35 in with its abutment 35b into engagement with the bottom 36a of the bore 36. When normally positioned in this manner, the annular grooves 35c in the valve plunger 35 are aligned with the ports 34 as shown in this Figure III. Also in alignment with these grooves 35c when the valve is shifted to this position by the spring 38, are the ports 39 formed in the cartridge 13, each of which ports is connected to the main supply passageway 40 also formed in the cartridge 13. This passageway 40 opens at its outer end into an annular groove 41 formed in the bearing surface 12a of the center drive ring gear 4. A main supply line 42 from a suitable source of hydraulic pressure is connected into the housing 5 by suitable means 43 where it is connected to a passageway 44 formed in this housing 5 which is also in alignment with a passageway 45, formed in the bearing 8 and which also is located so as to discharge at all times into the annular groove 41 in the bearing surface 12a of the center drive ring gear 4.

Suitable packing rings 46 fastened to the center drive ring gear 4 by suitable screws 47 maintains packing 48 in proper running engagement against the surfaces 49 of the respective bearings 7 and 8 so as to maintain lubricant in the various bearing surfaces of the bearings 7 and 8 in engagement with the bearings on the ring gear 4 and also to prevent foreign matter from getting into these bearing surfaces, during the machining operations on the work piece in the chuck.

It is also to be noted that there is provided a port 50, Figure III, which connects the chamber 51 of the shuttle valve 35 at all times to the supply passageway 40, so that fluid pressure may be delivered from the line 40 into the chamber 51 to shift the valve 35 downwardly as shown in this Figure III until its abutment surface 35d engages the surface 37a of the plug 37, which action of the valve causes the annular slots to move out of alignment with the respective ports 34 and 39, thus closing off the ports 34 from escape of fluid, to the annular slots 35c through the passageways 39 into the line 40. It is also to be noted that any escape of fluid from the annular slot 41 in the bearing surface 12a will merely serve to lubricate the bearing surfaces associated with the bearing 8 and will not escape outwardly because of the packing 48.

The operation of this hydraulic center drive chucking mechanism is substantially as follows:

The crankshaft C to be machined is first placed on the centers 1 and 2 in the center drive lathe with its respective webs 21 and 22 in their respective center drive chucking mechanism. Fluid pressure is then applied through the line 42 and thus through the various passageways described into the supply passageway 40 in the cartridge 13, Figure III. Under these conditions no pressure has as yet been built up in the various cylinders 14 since all the plungers 16 have not as yet engaged the work crankshaft web 21, so that the valve 35 will be positioned as shown in Figure III permitting fluid to pass through the ports 39, the annular grooves 35c out to the ports 34 and through the various passageways 25 to 32 inclusive in the plate 23 and thus through the passageways 33 into the respective cylinders 14. This causes each of the plungers 16 to seat itself with equalizing action on the crankshaft web 21 without in any way distorting the crankshaft from its true position on the axis of rotation 52 in the lathe. After all of these plungers 16 have thus been applied to the work with firm pressure to properly seat them on the web and with equalizing action, so that the crankshaft is not distorted from its true position on the axis 52, pressure will build up in the various lines and cause a back pressure or building up of hydraulic force in the line 40 which is discharged through the port 50 into the chamber 51 of the valve 35, causing its plunger to automatically move downwardly compressing the spring 38 as shown in Figure III bringing its abutment surface 35d against the surface 37a of the plug 37 and thus causing the various ports 34 to be automatically closed off against escape of fluid from the cylinders 14. When this has resulted the plungers obviously can not be pushed back by any force exerted on the work piece by the action of the cutting tools since the fluid in these lines is non-compressible. These plungers can not be moved backward because their discharge through the various passageways 34 has been positively cut off. It is also to be noted that with this arrangement each individual cylinder is individually closed off, so that there can be no equalizing action between the respective cylinders 14 even though the main supply line is disconnected from them. And it is also to be understood that because of the large number of radially distributed plungers, the force of any individual one as caused by the cutting action of the tools on the work is relatively small resulting in a positive rigid holding of the work with relatively small strain to any individual part of this arrangement.

After the work has been completed by the continuous application of fluid pressure through the line 42 to the line 40 while maintaining this cylinder 35 shifted to the locked out position with its surface 35d against the surface 37a of the plugs 37, fluid pressure is then released from the line 42 whereupon the valve plungers 35 will return to its position as shown in Figure III discharging fluid out of the chamber 51, since no pressure now exists in this chamber, under the influence of the return spring 38. And similarly as the valve reaches this position shown in Figure III the springs 18 behind the pistons 15 of the work engaging plungers 16 will return these cylinders to the position where the washer 20 engages the abutment 14b on the plugs 14a since the springs 18 are made relatively stronger than the springs 19 behind the washers 20. And as soon as the plungers 16 have automatically returned to their retracted position, the crankshaft is again removed from the centers 1 and 2 and moved out of the center drive chucking devices at the completion of the turning operations on the work.

Having thus fully set forth and described this invention, what I claim and desire to secure by United States Letters Patents is:

1. In a chuck, a rotary chuck body, a plurality of fluid actuated work engaging members, means for simultaneously applying fluid pressure to all of said work engaging members, and means for shutting off escape of fluid from each of said work engaging means.

2. In a chucking device, a rotatable chuck body, a plurality of hydraulically operated work engaging members in said body, a common source of fluid pressure for actuating all of said work engaging members simultaneously bringing them into engagement with a pre-located work piece in the chuck body with equalizing action, and means for restricting discharge of fluid pressure from each of said work engaging members when engaged on said work piece.

3. In a chuck, a rotary chuck body, a series of fluid pressure operated work engaging members in said chuck body, means for simultaneously applying fluid pressure to all of said work engaging members to effect an equalizing engagement of said members on a work piece in said chuck, and means automatically operated by the engagement of said work engaging members with said work piece for individually locking said work engaging members to said chuck body.

4. In a chuck, a series of hydraulically operated work engaging plungers radially distributed about the axis of rotation of said chuck body for movement to and from the axis of rotation of said chuck body, means for applying fluid pressure simultaneously to actuate all of said plungers toward said axis of rotation to engage a work piece in said chuck, and means automatically operated by the engagement of all of said plungers with said work piece to automatically lock said plungers against movement on said chuck body.

5. In a center drive lathe, means for centering a work piece on the axis of rotation of said lathe, a chucking device associated with said centering means for gripping and rotating a work piece on said centering means comprising a rotary chuck body, a series of fluid pressure actuated work engaging members on said chuck body, means for applying fluid pressure simultaneously to all of said work engaging members to engage them on said work piece in said lathe, means for automatically preventing further application of fluid to said work engaging members and preventing fluid pressure from escaping from said work engaging members when all of said members have engaged said work piece.

6. In a center drive lathe, having means for prelocating and centering a work piece on the axis of rotation in said lathe, a center drive chucking device adapted to grip said prelocated work piece intermediate its ends by means of rough irregular surfaces on said work piece comprising a center drive ring gear, means for rotating said ring gear, chucking mechanism in said ring gear comprising a series of fluid pressure actuated work engaging members, fluid pressure means for simultaneously moving all of said plungers into engagement with a work piece prelocated in said lathe, and fluid pressure means automatically operated by engagement of said plungers with said work piece for locking said work engaging members individually and rigidly to the chuck body when engaged on said work piece.

7. In a chuck, a rotary chuck body, a series of fluid operated plungers mounted for radial movement relative to the axis of rotation of said chuck body, a source of fluid pressure adapted to be connected to said chuck body, a control valve in said chuck body connected in series with said plungers and said source of fluid pressure, and means whereby engagement of said work engaging members on the work piece effects operation of said valve to close off fluid pressure from going to or from said work engaging members.

8. In a chucking mechanism, means for prelocating a work piece on the axis of rotation of the chuck body, a series of fluid pressure operated work engaging plungers radially movable in said chuck body, fluid pressure means for moving said plungers toward the axis of rotation of said chuck body, spring means for returning said plungers radially away from said axis, a source of fluid pressure applicable to said chuck body, a control valve in said chuck body connected to all of said fluid pressure operated plungers and connected to said source of fluid pressure, means whereby fluid pressure may be applied through said control valve to said plungers to individually move all of said plungers toward said axis of rotation with equalizing movement, and means automatically operated by the movement of said valve to effect a closing off of fluid pressure from said source of fluid pressure to said plungers and for preventing escape of fluid pressure from said plungers.

9. In a center drive chucking device, a rotary ring gear journaled in a housing of a machine tool, a series of pistons having work engaging plungers connected thereto operating in cylinders formed in said ring gear, a source of fluid pressure connectable to said housing and through the journal of said ring gear in said housing to transmit fluid pressure to said rotary chuck body, a control valve mounted in said chuck body, interconnected between each of said work engaging plunger cylinders and said source of fluid pressure, said control valve being arranged to transmit fluid pressure to each of said plungers simultaneously to effect an equalizing movement of said plungers relative to said axis of rotation of said chuck body, said valve also being automatically effective to simultaneously lock said plungers against movement on said chuck body when all of said plungers have been limited in inward radial movement by engagement with the work piece in said chuck body.

10. In a center drive lathe, a pair of centers for supporting the end portions of a work piece on the axis of rotation in said lathe, one or more center drive chucking devices in said lathe each having a rotary ring gear, a series of fluid pressure operated plungers adapted to be actuated toward the axis of rotation of said work piece to engage said work piece positioned in said lathe, resilient means for returning said work engaging plungers from said work piece, a source of fluid pressure adapted to be applied to said ring, a shuttle valve slidably mounted in said ring gear having a passageway connected to each of said work engaging plungers and mating passageways connected to said source of fluid pressure, means whereby said valve may be actuated by said source of fluid pressure, and means whereby engagement of said work engaging members with said work piece causes said valve to be operated by said source of fluid pressure to prevent escape of fluid from said work engaging plungers when fully engaged on said work piece.

WILLARD L. GROENE.